United States Patent
Knutson

[11] 3,756,282
[45] Sept. 4, 1973

[54] ELECTRIC MOTOR CONTROLLED FLUID VALVE

[75] Inventor: Dale A. Knutson, Oconomowoc, Wis.

[73] Assignee: Applied Power Inc., Milwaukee, Wis.

[22] Filed: May 30, 1972

[21] Appl. No.: 257,968

[52] U.S. Cl............................ 137/625.64, 251/133
[51] Int. Cl............................................. F16k 11/00
[58] Field of Search.................. 137/625.64, 625.65, 137/625.25, 625.29, 625.34; 251/133, 134, 135

[56] References Cited
UNITED STATES PATENTS
3,482,604  12/1969  Fleckenstein et al...... 137/625.64 X Primary Examiner—Henry T. Klinksiek
Assistant Examiner—Robert J. Miller
Attorney—James E. Nilles

[57] ABSTRACT

An electric motor controlled hydraulic or pneumatic valve including a valve housing having a main spool positioned to control the flow of fluid from a pressure port to a fluid circuit, the spool including a threaded bore at one end, a high speed low torque reversible electric motor mounted on said housing and being connected to the spool by a threaded rod to provide high torque output to the spool and an electric control circuit including a bridge circuit having a manually controlled variable resistance, a feed back variable resistance mechanically connected to the spool, and a pair of solid state switches or relay circuits connected across the bridge circuit to provide an electric signal to the electric motor in response to movement of the manually controlled variable resistance.

15 Claims, 6 Drawing Figures

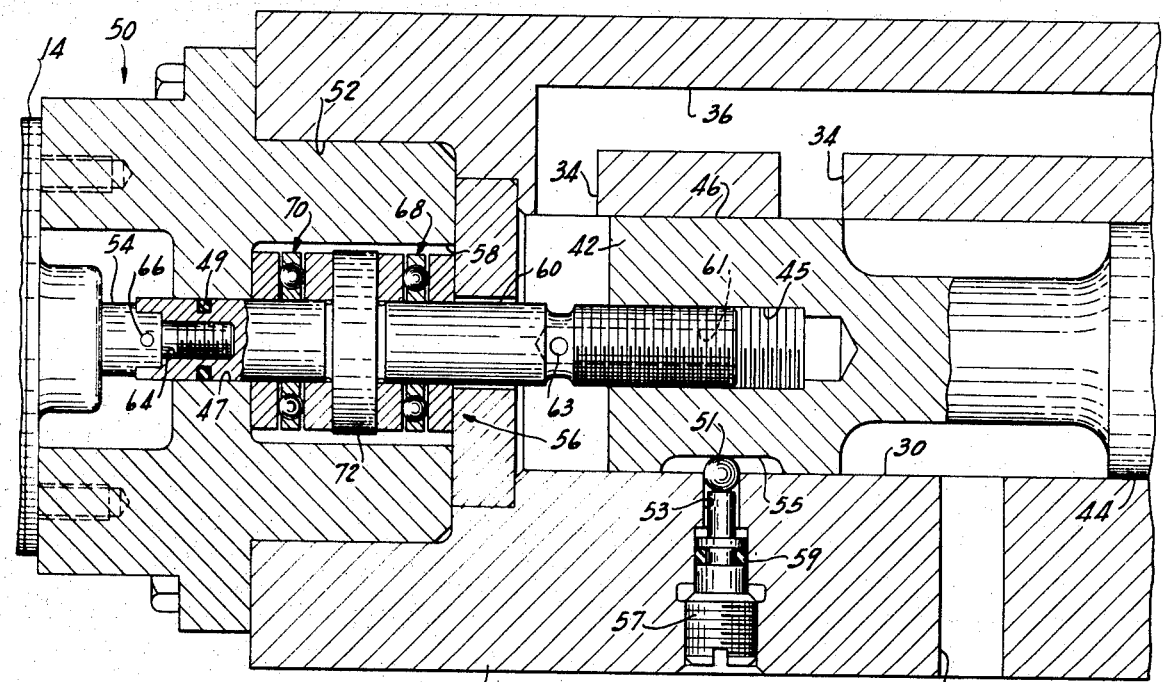
Fig. 2
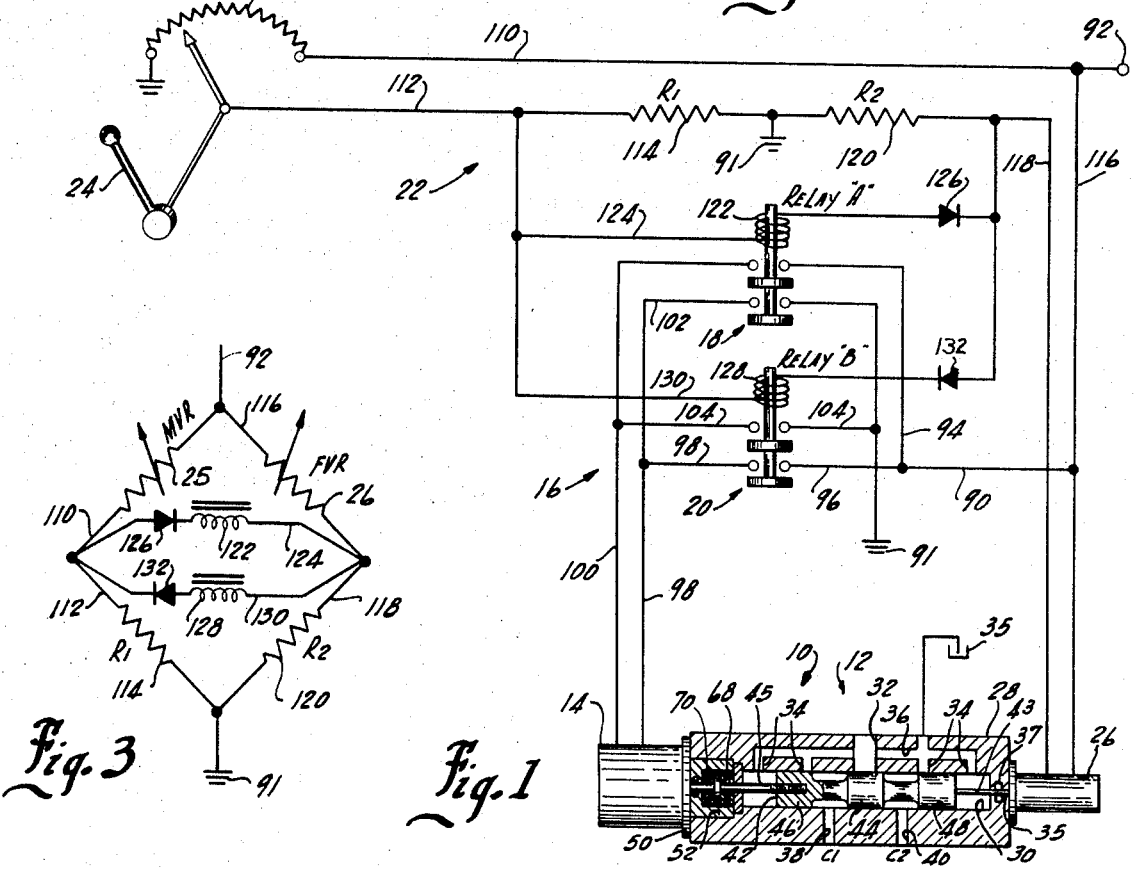
Fig. 3
Fig. 1

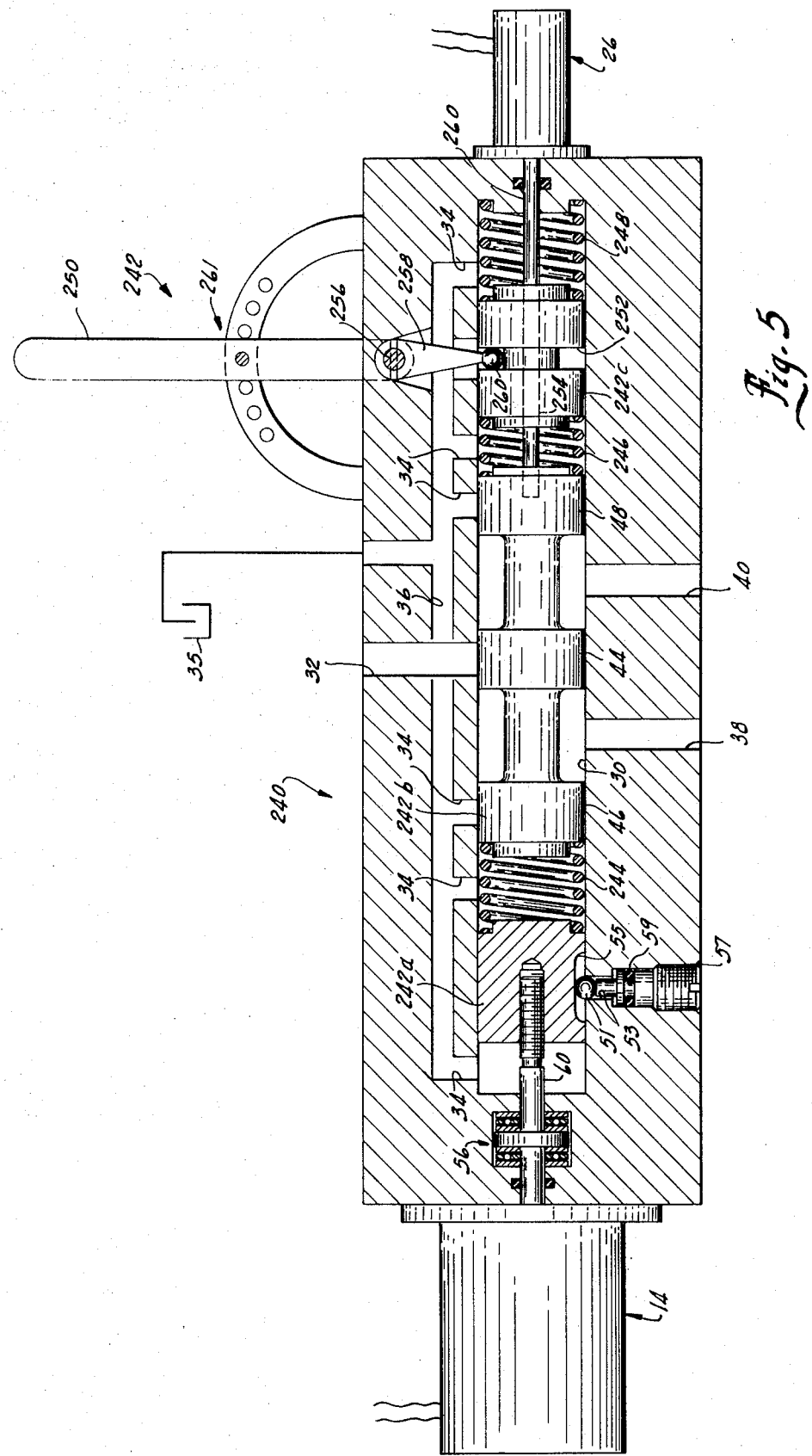

ELECTRIC MOTOR CONTROLLED FLUID VALVE

SUMMARY OF THE INVENTION

The fluid valve of the present invention provides for automatic motor control of a hydraulic or pneumatic valve by a single stage drive. The movement of the valve spool is achieved by a threaded connection between an electric motor and a threaded bore in the valve spool. With this arrangement, it is possible to use a high-speed, low torque electric motor and obtain high torque output for controlling a high flow valve. The valve may be provided with a manual override. Accuracy in metering the flow of fluid is achieved by providing a movement to the valve spool which corresponds to the movement of the controller. This is achieved by using a feed back loop which includes a variable resistance that is connected to the valve spool. The electric motor will stop when the valve spool has moved a distance corresponding to the direction and distance of movement of the controller.

DRAWING

FIG. 1 is a cross sectional view of the valve of this invention showing a dc wiring circuit;

FIG. 2 is an enlarged view of a portion of the valve showing the drive connection;

FIG. 3 is a schematic view of the control circuit;

FIG. 5 is a view of another modified type valve having a manual override; and

DESCRIPTION OF THE INVENTION

Figure 6:
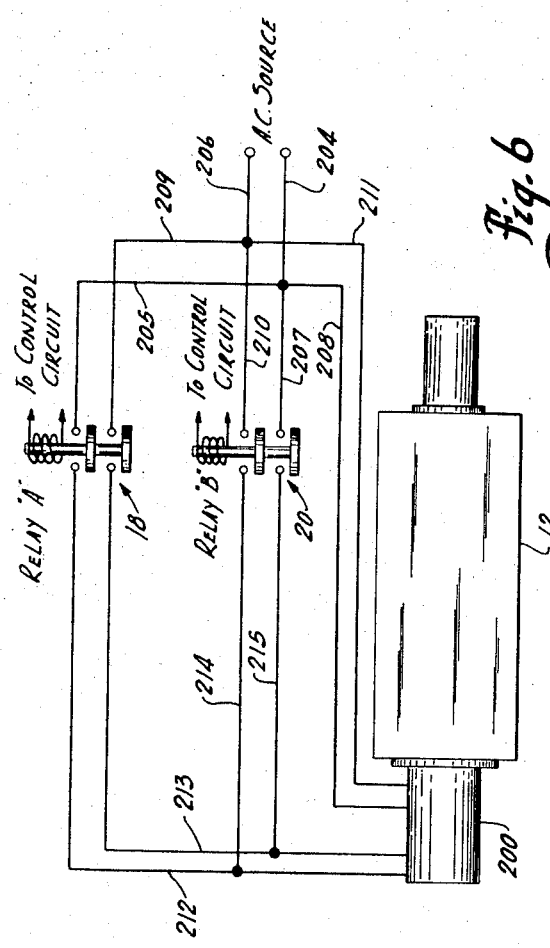
FIG. 6 is a schematic wiring diagram for the valve showing an ac power circuit.

The electric motor controller valve 10 of the present invention includes a valve 12 and a reversible electric motor 14. The electric motor 14 is controlled by means of an electric circuit 16 having solid state or solenoid actuated switches 18 and 20 for controlling the direction of rotation of the motor 14. A low power control circuit 22 which includes a manual input controller 24 having a variable resistance 25 and a feed back variable resistance 26 to control the solenoid switches 18 and 20. Movement of the controller 24 in either direction will produce a corresponding energization of the motor 14 to open the valve 12. The amount of movement of the controller 24 produces a corresponding amount of movement of the valve spool 42 through the feed back signal from the variable resistance 26.

The Fluid Valve

The valve 12 can be any conventional type fluid control valve either hydraulic or pneumatic and as seen in FIG. 1 generally includes a valve housing 28 having a cylindrical bore 30. A pressure port 32 is centrally located in the valve housing 28 and a number of relief ports 34 are connected to a tank 35 through a passage 36. A pair of fluid circuit passages 38 and 40 are provided in the housing 28 and are connected to a fluid circuit.

Flow of fluid from the pressure port 32 to the fluid circuit passages 38 and 40 is controlled by a spool 42 positioned in the cylindrical bore 30. The spool 42 includes a first or central land 44 which is positioned to control the pressure port 32, second and third lands 46 and 48 which are positioned to control flow to the relief ports 34 and a threaded bore 45 at one end. Movement of the spool 42 to the right will open the pressure port 32 allowing fluid to flow through the bore 30 to the fluid circuit passage 38. Fluid returned through passage 40 will flow through the relief port 34 to tank. Movement of the spool 42 to the left will open the pressure port 32 allowing fluid to flow through the bore 30 to the fluid passage 40. Fluid returned through passage 38 will flow through the relief port 34 to tank 35. Other conventional types of valve spool configurations and porting may also be employed with this means of control.

The Electric Motor

The reversible electric motor 14 is mounted on an end block 50 which is positioned in a counterbore 52 at the end of the cylindrical bore 30 of the valve housing 28 and has a central opening 47. The output shaft 54 of the motor 14 is connected to the spool 42 by means of a thrust assembly 56.

In this regard, the thrust assembly 56 is positioned within a recess 58 provided on the inner side of the block 50. The assembly 56 includes a drive shaft or rod 60 which extends through the opening 47. An externally threaded section 62 is provided at one end and an internally threaded bore 64 is provided at the other end. The rod 60 is threadedly connected to the drive shaft 54 of the electric motor 14 and is pinned or locked to the drive shaft by a pin 66. The threaded section 62 of the rod 60 is threadedly received in the threaded bore 45 provided on the end of the spool 42. The rod 60 is sealed in the opening 47 by means of an O-ring seal 49.

Fluid pressure built up in the bore 45 is relieved by means of a passage 61 in the rod 60 and a cross bore 63 at the inner end of the passage 61. Axial forces exerted on the rod 60 are relieved by thrust bearings 68 and 70 provided on each side of a radial flange 72 on the rod 60.

On rotation of the rod 60 by the motor 14 the spool 42 will move axially in either direction in the bore 30 depending on the direction of rotation of the rod 60 due to the threaded connection between the threaded section 62 and the threaded bore 45. Means are provided for preventing rotation of the spool 42 due to the rotary motion of the drive shaft or rod 60. Such means is in the form of a ball 51 provided in a port 53 in the valve housing 28 and a groove 55 in the spool 42. The ball 51 is retained in the port 53 by means of a plug 57 threadedly received in the port 53. The plug 57 is sealed in the port 53 by means of an O-ring seal 59.

Means are provided for producing an electric signal in response to movement of said valve spool 42 in the form of variable resistance 26. The axial movement of the spool 42 is transmitted to the variable resistance 26 by means of a rod 43. The rod 43 is connected to the spool 42 and to the variable resistance 26 through an opening 35 in the end of bore 30. The rod 43 is sealed in the opening 35 by an O-ring seal 37.

The valve contemplated in the present invention is capable of relatively high flow rates (e.g., 30 to 100 gallons per minute). In order to achieve maximum flow, the spool 42 must be moved approximately plus or minus 0.250 inch or more in either direction. In a valve of this type, the response characteristic required is generally approximately 2.5 cycles per second.

The motor required to provide the above requirements for the valve is an AC or DC reversible motor having a continuous duty cycle at rated load. This type of motor is normally characterized as being a high speed low torque motor.

In order to obtain the desired response characteristic of 2.5 cycles per second the pitch of the thread on the threaded section 62 of rod 60 is determined by the rpm of the motor and the maximum stoke of the spool 42. The mechanical advantage of the thread which enages rod 60 with spool 42 provides a relatively high driving force to move the spool 42 against frictional and flow forces.

The Electric Circuit

The reversible DC motor 14 is controlled by means of the electric circuit 16 which includes an electric line 90 connected to a DC power source 92 and to the solid state or solenoid switches 18 and 20 by lines 94 and 96. The line 96 is connected to the reversible motor 14 by lines 98. The line 94 is connected to the motor 14 by line 100. The line 98 is connected to ground 91 through switch 18 by line 102. The line 100 is connected to ground 91 through switch 20 by line 104.

The valve 12 is actuated by closing switch 20 to energize the motor 14 through lines 90, 96 and 98, 100 and 104 or by closing switch 18 to energize motor 14 through lines 90, 94, 100, 98 and 102. The direction of rotation of the motor 14 can be set to move the valve 42 in the same direction as the motion of the controler 24.

If an AC motor 200 is used in place of a DC motor, the electric circuit 202 should be as shown in FIG. 6. The circuit 202 is connected to an AC power source by lines 204 and 206. The line 204 is connected to solenoid switch 18 by line 205, to solenoid switch 20 by line 207 and to the motor 200 by line 208. The line 206 is connected to the solenoid switch 18 by lines 209, to the solenoid switch 20 by line 210 and to the AC motor 200 by line 211. The AC motor is connected to the solenoid switch 18 by lines 212 and 213 and to the solenoid switch 20 by lines 214 and 215. The solid state or solenoid switches 18 and 20 are controlled by the DC control circuit as described hereinafter. Closing of switch 18 or switch 20 will complete the corresponding circuit to the act motor producing opposing directions of rotation with a corresponding movement of the valve spool.

The Control Circuit

The motor circuit 16 is controlled by means of the low power control circuit 22 which includes the manual input controller 24 and the feedback resistance 26. Referring to FIG. 1, it will be noted that the control circuit is in the form of a bridge circuit having a first leg or line 110 which includes the controller resistance 25, a second leg or line 112 which includes a fixed resistance 114, a third leg 118 which includes a fixed resistance 120, a fourth leg 116 which includes the variable resistance 26.

Referring to FIG. 3, a schematic wiring diagram of the bridge circuit is shown with the first and third lines 110 and 116 connected to the DC power source 92 and the second and third lines 112 and 118 connected to the ground 91. The solid state switch or coil 122 for the solenoid switch 118 is connected across the bridge circuit by line 124 which includes a diode 126. The solid state switch or coil 128 for the solenoid 20 is connected across the bridge circuit by a line 130 which includes a diode 132. As is generally understood in a bridge circuit, the fixed resistance R1 and R2 are balanced and movement of the manual controller 24 will produce an unbalance in the system causing a current to flow through one or the other of the lines 124 or 130, depending on the diodes 126 and 132.

Assuming current flow through 124, the solenoid 18 will be closed, energizing the motor 14. If the motor 14 produces a movement of the spool 42 to the left, it will connect passage 32 with circuit passage 40 and passage 38 to the return passage 34. A corresponding movement will also occur in the variable resistance 26, changing the resistance 26 until it is again balanced or equal to the resistance 25. Once the bridge circuit is balanced, the current will stop in line 124, deenergizing the solenoid 18 and opening the circuit to the motor 14.

Assuming current flow through the line 130, the solenoid switch 20 will be closed, energizing the motor 14 but producing opposite rotation of the drive shaft 54. If the motor produces a movement of the spool 42 to the right, it will connect passage 32 with circuit passage 38 and passage 40 with return passage 34. A corresponding movement will also occur in the variable resistance 26 but in the opposite direction, changing the resistance 26 until it is again balanced or equal to the resistance 24. It should be noted that the position of the controller 24 always determines the position of the valve spool since the resistance 26 must move to the same position before the motor stops.

Figure 4:
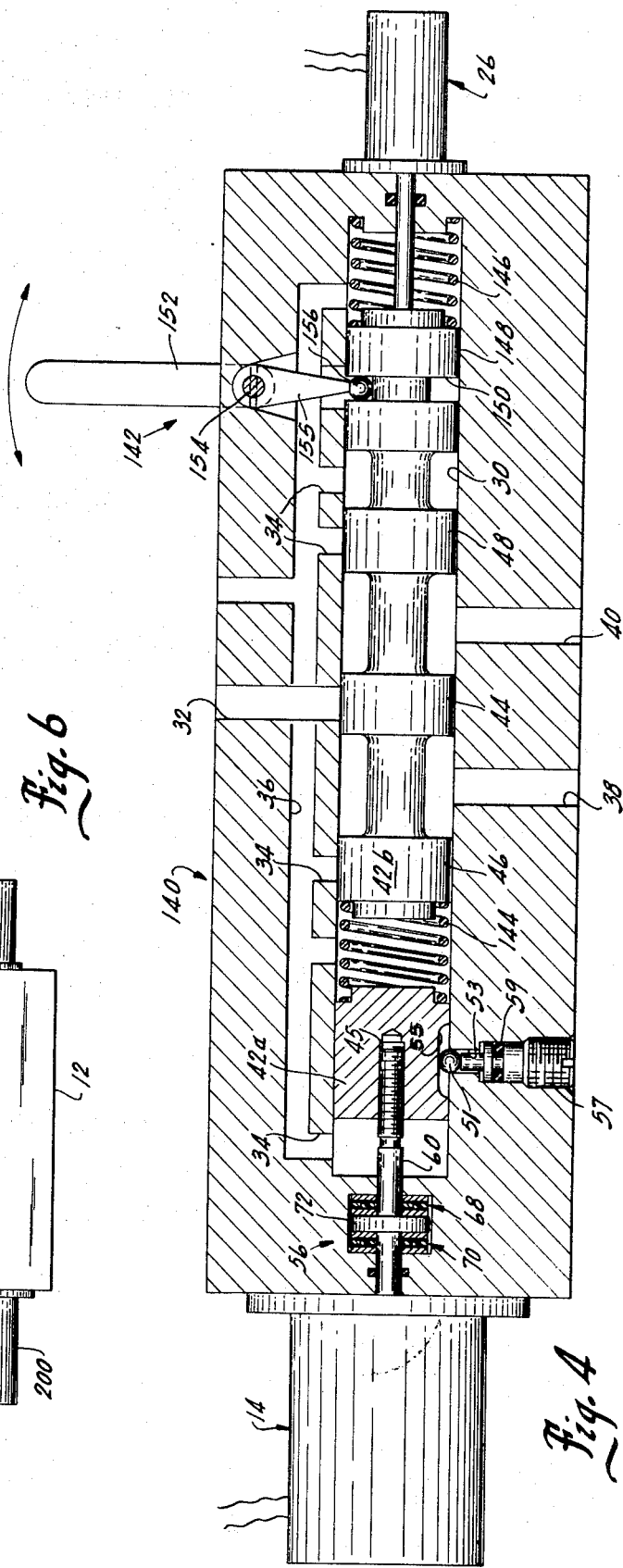
FIG. 4 is a view of a modified type valve having a manual override.

Manual Override (FIG. 4)

A modified valve 140 is shown having a manual override assembly 142. In this regard, the spool 42 for the valve is separated into a drive section 42a and a control section 42b. The drive section 42a includes a threaded bore 45 which is threadedly connected to the drive shaft 60 as described above. Rotation of drive section 42a is prevented by means of a ball 51 positioned to engage a groove 55 provided in the drive section 42a.

The control section 42b is centered or retained in the null position by means of springs 144 and 146 of substantially equal spring rates. The spring 144 is positioned between the drive section 42a and control section 42b. The spring 146 is positioned between the other end of the control section 42b and the end of the passage 30 in the housing 28.

The control section 42b is moved manually in the passage 30 by means of the manual override assembly 142. In this regard, the control section 42b includes a fourth land 148 having an outer groove 150. A handle 152 is mounted for pivotal movement on a shaft 154 which includes a lever 155 at its inner end having a ball 156 positioned in the groove 150. Movement of the handle 152 either clockwise or counterclockwise will produce a corresponding movement of the control section 42b against the bias of one or the other of the springs 144 and 146. On release of the handle, the compressed spring 144 or 146 will return the spool control section 42b to the null position. It should be apparent that normal operation of the electric motor will move the drive section 42a either toward or away from the control section with the spring 144 or 146 moving the control section 42b in the same direction as the drive section 42a.

Manual Override (FIG. 5)

In another form of override valve 240, a manual override assembly 242 is shown having means for preventing movement of the handle 250 during normal electric motor operation of the valve. In this embodiment, the valve spool includes a drive section 242a, a control section 242b and an override section 242c. The control section 242b is centered or biased to a null position by means of the compression springs 244 and 246, respectively.

In this regard, the spring 244 is positioned between the drive section 242a and the control section 242b. The spring 246 is positioned between the control section 242b and the override section 242c. A third spring 248 can be positioned between the override section 242c and the end of the passage 30. During normal electric motor operation, the axial movement of the drive section to the right or left will either compress or expand springs 244 and 246 producing a corresponding movement in the control section 242b.

Manual override of the control section 242b is accomplished by means of the override assembly 242c. In this regard, the override section 242c is provided with an annular groove 252 and a central passage 254. The handle 250 is connected to a pivot shaft 256 which includes a lever arm 258 having a ball 260 at its outer end positioned in groove 252. The handle 250 is normally locked by a pin and latch assembly 261 in a fixed position so that it will also hold the override section 242c in a fixed position. On movement of the lever 250 either clockwise or counterclockwise a corresponding movement will be transferred to the override section 242c producing a corresponding change in the position of the control section 242b. The feedback resistance 26 is connected to the control section 242b by means of a rod 260 through the passage 254 in the override section 242c to provide a direct relation between the movement of the control section 242b and the feedback resistance 26.

I claim:

1. An electric motor controlled hydraulic or pneumatic valve comprising:
    a valve housing having a cylindrical bore,
    a valve spool mounted for axial movement in said bore for controlling the flow of fluid through said valve housing, said spool having a threaded bore in one end, a reversible high speed low torque electric motor mounted on one end of said housing and having an output shaft extending into said cylindrical bore,
    means for threadedly connecting the output shaft of said motor to said threaded bore,
    an electric power circuit operatively connected to said motor,
    and a low power electric control circuit connected to said electric power circuit to control said electric circuit, said control circuit including
    manual input means and an electric signal means connected to respond to the movement of said valve spool to de-energize said motor upon movement of said valve spool a distance corresponding to the distance of movement of said input means.

2. A valve according to claim 1 wherein said power circuit includes a pair of solid state or solenoid switches and said control circuit includes a bridge circuit having a pair of relay circuits connected to actuate one or the other of said solid state or solenoid switches to thereby control the direction of rotation of said motor.

3. A valve according to claim 1 wherein said manual input means includes a first variable resistance and said electric signal means includes a second variable resistance,
a bridge circuit having a first fixed resistance connected in series with said first variable resistance and a second fixed resistance connected in series with said second variable resistance and a pair of relay circuits connected across said bridge circuit.

4. The valve according to claim 1 including means for manually overriding said drive motor.

5. The valve according to claim 4 wherein said valve spool includes a drive section and a control section, means for biasing said control section to a null position and said manual override means includes a handle operatively connected to move said control section independent of said drive section.

6. The valve according to claim 4 wherein said valve spool includes a drive section, a control section and an override section, said manual override means comprising a handle operatively connected to said override section.

7. An electric motor controlled fluid valve comprising:
    a valve housing having a cylindrical bore,
    a valve spool mounted for axial movement in said bore for controlling the flow of fluid through said housing, said spool having
    a threaded bore at one end,
    a reversible high speed low torque electric motor mounted on one end of said housing and having an output shaft extending into said cylindrical bore,
    means for threadedly connecting the output shaft of said motor to said threaded bore, and
    means for selectively energizing said motor whereby the rotary motion of said motor produces axial movement of said valve spool.

8. The valve according to claim 7 including means for manually moving said valve spool.

9. The valve according to claim 7 wherein said valve spool includes a drive section and a control section, and a manual override means including a lever operatively connected to said control section.

10. The valve according to claim 7 wherein said means for energizing said motor includes an electric power circuit and an electric control circuit connected to control said power circuit, said control circuit having a manual input means and an electric signal feed back means connected to respond to the movement of said valve spool to de-energize said motor upon displacement of said spool a distance corresponding to the distance of movement of said input means.

11. The valve according to claim 7 wherein said valve spool includes a drive section, a control section and an override section and means for biasing said control section to a null position in said bore and means operatively connected to said override section for moving said control section independently of said drive section.

12. An electric motor controlled fluid valve comprising:
    a valve housing having a central flow passage connected to an inlet port, a tank port and a pair of fluid flow ports,
    a valve spool mounted in said central flow passage to control the flow of fluid between said inlet port and one of said fluid flow ports and between the other of said fluid flow ports and said tank port, said valve spool having
    a threaded bore at one end,
    means for preventing rotary motion of said valve spool on axial movement in said passage, a reversible high speed low torque electric motor mounted on one end of said valve housing and having a drive shaft, means threadedly connecting said drive shaft to one said threaded bore in said valve spool, an electric power circuit connected to said motor, and an electric control circuit connected to said power circuit, said control circuit including a manually controlled variable resistance mechanically connected to said valve spool.

13. The valve according to claim 12 wherein said control circuit comprises a bridge circuit having a pair of relay switches connected to control said power circuit, said manually controlled variable resistance and said feed back variable resistance being connected in said bridge circuit.

14. A valve according to claim 12 wherein said valve spool includes a drive section and a control section, means for biasing said control section to a null position in said passage and manual override means for moving said control section independently of said drive section.

15. A valve according to claim 12 wherein said valve spool includes a drive section, a control section and an override section, means for biasing said control section to a null position in said passage and means for manually moving said override section to move said control section independently of said drive section.

* * * * *